United States Patent
Gadde et al.

(10) Patent No.: US 8,646,090 B1
(45) Date of Patent: Feb. 4, 2014

(54) HEURISTIC IPSEC ANTI-REPLAY CHECK

(75) Inventors: Ravi Gadde, San Jose, CA (US);
Satyadeva Konduru, Sunnyvale, CA (US); Umesh Mangla, San Jose, CA (US); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1494 days.

(21) Appl. No.: 11/866,424

(22) Filed: Oct. 3, 2007

(51) Int. Cl.
*G06F 9/00* (2006.01)

(52) U.S. Cl.
USPC .............................................. 726/26; 726/13

(58) Field of Classification Search
USPC ................ 726/13, 26, 30, 32; 714/2; 713/178
See application file for complete search history.

(56) References Cited

U.S. PATENT DOCUMENTS

| | | | |
|---|---|---|---|
| 6,978,384 B1* | 12/2005 | Milliken | 726/26 |
| 7,571,343 B1* | 8/2009 | Xiang et al. | 714/2 |
| 7,577,837 B1* | 8/2009 | Ithal et al. | 713/163 |
| 8,065,726 B2* | 11/2011 | Burkley et al. | 726/22 |
| 2003/0012212 A1* | 1/2003 | Earnshaw et al. | 370/428 |
| 2006/0037077 A1* | 2/2006 | Gadde et al. | 726/23 |
| 2007/0083923 A1* | 4/2007 | Fluhrer et al. | 726/12 |
| 2007/0115812 A1* | 5/2007 | Hughes | 370/229 |
| 2007/0214251 A1* | 9/2007 | Li | 709/223 |
| 2008/0288872 A1* | 11/2008 | Burkley et al. | 715/723 |
| 2008/0295163 A1* | 11/2008 | Kang | 726/13 |
| 2008/0301759 A1* | 12/2008 | Rivers et al. | 726/1 |
| 2009/0158417 A1* | 6/2009 | Khanna et al. | 726/12 |

OTHER PUBLICATIONS

Kent, Stephen, BBN Technologies, Comment on RFC 4302—"IP Authentication Header," The Internet Society, Network Working Group, Dec. 2005, 27 pgs.

* cited by examiner

*Primary Examiner* — Eleni Shiferaw
*Assistant Examiner* — Abu Sholeman
(74) *Attorney, Agent, or Firm* — Harrity & Harrity, LLP

(57) ABSTRACT

By using an extended bitmap window and arrival sequence numbers, a multiprocessor system may perform anti-replay checks on incoming packets in a similar order as a single processor system. In one implementation, a device may provide an anti-replay check window that includes an original window and an extension window, the original window being contiguous to the extension window. In addition, the device may receive a packet with an anti-replay sequence number and receive another packet whose anti-replay sequence number is within a range of the original window. In addition, the device may determine if the packet has arrived before the other packet by less than a threshold if the anti-replay sequence number of the packet falls within a range of the extension window. Further, the device may retain the packet if the packet has arrived before the other packet by less than the threshold.

22 Claims, 9 Drawing Sheets

HEURISTIC IPSEC ANTI-REPLAY CHECK

BACKGROUND

Internet Protocol Security (IPSec) provides for many security features for communicating systems. One of the security features includes anti-replay. When anti-replay is in effect, a receiving system may attempt to prevent a duplicate packet from being processed at the receiving system.

SUMMARY

In the following implementations, by using an extended anti-replay check window and arrival sequence numbers, a multiprocessor system may perform anti-replay checks on incoming packets in a similar order as a single processor system.

According to one aspect, a method may comprise providing an anti-replay check window that includes an original window and an extension window, the original window being contiguous to the extension window. Additionally, the method may further comprise receiving a packet with an anti-replay sequence number and receiving other packet whose anti-replay sequence number is within a range of the original window. Additionally, the method may further comprise, if the anti-replay sequence number of the packet falls within a range of the extension window, determining if the packet has arrived before the other packet by less than a threshold. Additionally, the method may further comprise retaining the packet if the packet has arrived before the other packet by less than the threshold.

According to another aspect, a device may comprise a window that includes an original window and an extended window, the extended window being adjacent to the original window and the original window identifying ant-replay numbers that are associated with received packets and indicating if any of anti-replay numbers in a range of the original window are included in the received packets. In addition, the device may further comprise one or more processors, configured to receive a packet with an anti-replay number, and assign an arrival number to the packet. In addition, the one or more processors may be configured to determine if the packet is a replay packet using the anti-replay number, the arrival number, and a threshold if the anti-replay number of the packet falls in a range of the extended window, and accept the packet if the packet is not a replay packet.

DETAILED DESCRIPTION OF PREFERRED EMBODIMENTS

The following detailed description refers to the accompanying drawings. The same reference numbers in different drawings may identify the same or similar elements.

An "arrival sequence number" (ASN), as used herein, may refer to a number that is provided for each packet that arrives at a device. ASNs may be dispensed in the order that the packets arrive. Examples of an ASN may include the time of a packet arrival and a floating programmable gate array (FPGA) sequence number.

A "replay attack," as used herein, may refer to a type of network attack in which valid communication data is duplicated and multiple copies of the same packets are sent to a receiver of the communication data. The replay attack may be performed by an entity that intercepts the communication data.

A "replay packet," as used herein, may refer to a packet that is duplicated and sent to the receiver of the communication data. In addition, "replay packet" may also refer to a packet that has a significant potential to be a duplicate packet.

As used herein, an "anti-replay check" may refer to a process for checking if a packet is a replay packet. As a consequence of an anti-replay check, a packet that is determined as a replay packet may be dropped or rejected. A "dropped packet," "discarded packet," or a "rejected packet," as used herein, may refer to a packet that is no longer processed or used in accordance with purposes for which the packet is generated. For example, a router that prevents a received packet from reaching its destination may "drop" or "discard" the packet. An "accepted packet" or "retained packet" may include a packet that is not dropped, discarded, or rejected.

In the following, a bitmap window, an extension to the bitmap window and an arrival sequence number (ASN) register for storing an arrival sequence number may be used for anti-replay checks. Both the bitmap window and the extension may include bits that relate to anti-replay information about a group of packets. By using the extension and the ASN register in conjunction with the bitmap window during anti-replay checks, packets that may be unnecessarily dropped using only the bitmap window may be retained.

More specifically, in a multiprocessor environment, incoming packets may be checked for anti-replay by different processors. In such an instance, by using the extension and the ASN, the processors may perform anti-replay checks on incoming packets in a similar order as a single processor system.

Figure 1:
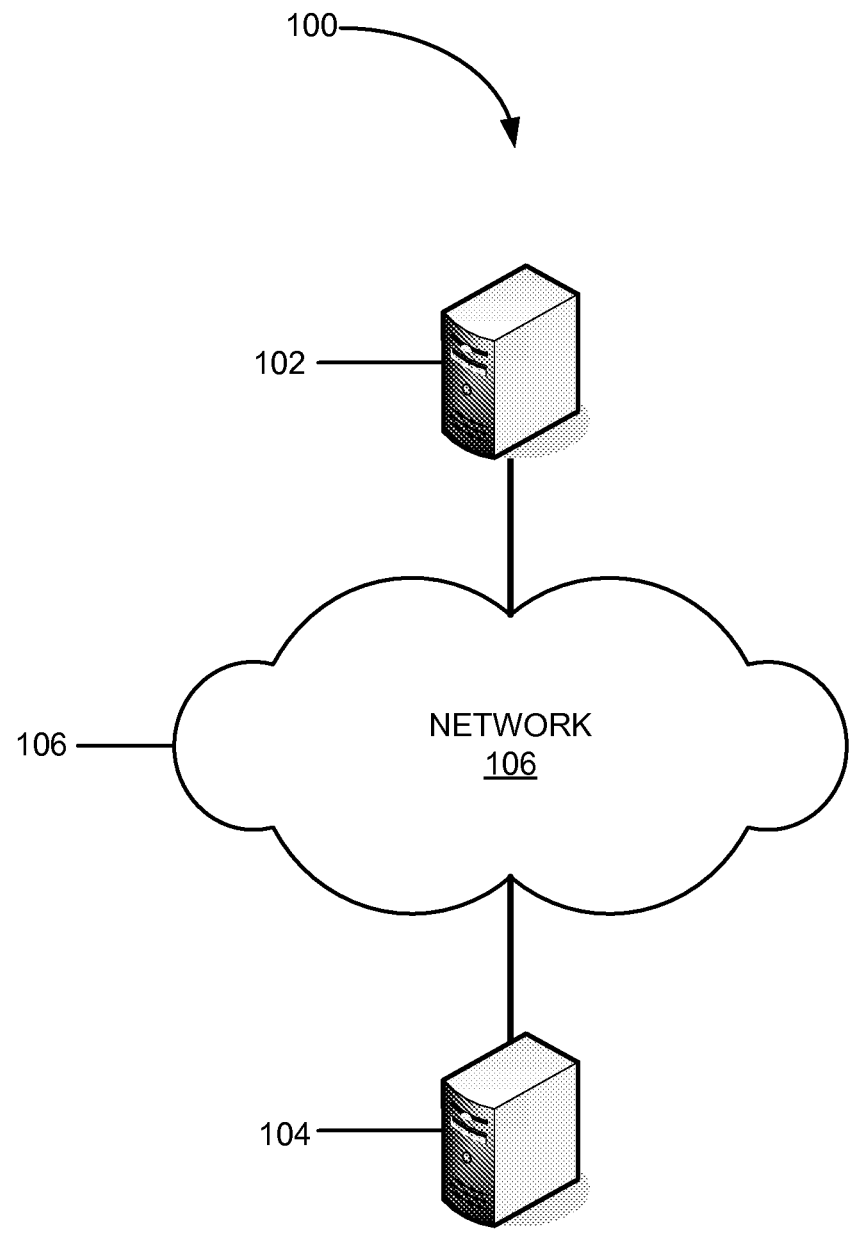
FIG. 1 shows an exemplary system in which concepts described herein may be implemented.

FIG. 1 shows an exemplary system 100 in which concepts described herein may be implemented. As shown, system 100 may include a security device 102, a security device 104, and network 106. In other implementations, system 100 may include fewer, additional, or different elements than those illustrated in FIG. 1. For example, system 100 may include a packet shaper for controlling congestion. In another example, security device 102 and security device 104 may be implemented identically (e.g., each of security devices 102 and 104 may include an edge router). In another example, security device 102 and security device 104 be implemented as a server device and a router, respectively. In yet another example, system 100 may include many more security devices.

Security device 102 may include a device that belongs to a security association (SA) that conforms to Internet Protocol (IP) security (IPSec). Examples of security device 102 might include a personal computer, a mobile communication device, etc. Security device 102 may support IPSec, and therefore, may send or receive IPSec packets. Security device 104 may include another device that belongs to the same SA. Examples of security device 104 might include a router, a server device, etc. While security devices 102 and 104 may be implemented differently, both security devices 102 and 104 may support IPSec and may communicate with one another based on IPSec.

Network 106 may include the Internet, an ad hoc network, a local area network (LAN), a wide area network (WAN), a metropolitan area network (MAN), a cellular network, a public switched telephone network (PSTN), any other network, or combinations of networks. In addition, network 106 may include devices that support IPSec. For example, network 106 may include routers that perform IPSec anti-replay checks and route IPSec packets to/from security device 102 and security device 104.

Figure 2:
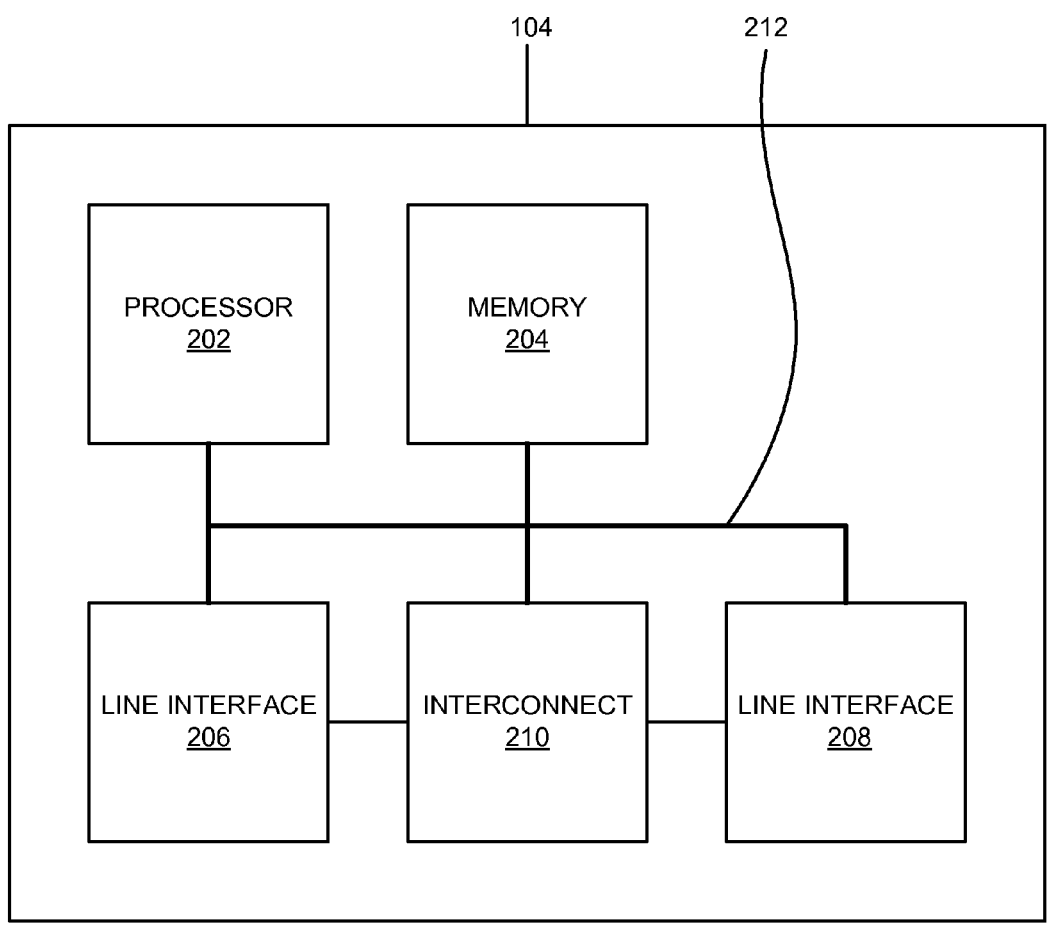
FIG. 2 is a block diagram of an exemplary security device of FIG. 1.

FIG. 2 is a block diagram of security device 104. As shown, security device 104 may include a processor 202, memory 204, a line interface 206, a line interface 208, an interconnect 210, and a bus 212. In different implementations, security device 104 may include additional, fewer, or different components than the ones illustrated in FIG. 2. For example, if security device 104 is implemented as a router, security device 104 may include additional line interfaces. In another example, if security device 104 is implemented as a client device (e.g., a personal computer), security device 104 may include a display, a microphone, and software components such as a browser, an instant messenger, etc. In yet another example, if security device 104 is implemented as a server device, security device 104 may include a large storage for fast data access, and software components, such as a web server, an application server, an email server, etc.

Processor 202 may include one or more processors, microprocessors, and/or processing logic optimized for networking and communications. Processor 202 may process packets and/or network path-related information. Memory 204 may include static memory, such as read only memory (ROM), dynamic memory, such as random access memory (RAM), and/or onboard cache, for storing data and machine-readable instructions. In FIG. 2, part of memory 204 may be used to cache and/or buffer packets that arrive at security device 104. In some implementations, memory 204 may also include storage devices, such as a floppy disk, a CD ROM, a CD read/write (R/W) disc, and/or flash memory, as well as other types of storage devices.

Line interfaces 206 and 208 may include devices for receiving incoming packets from network 106 and for transmitting packets to network 106. Interconnect 210 may include switches for conveying an incoming packet from line interface 206 to line interface 208 based on a packet destination and stored path information. Examples of interconnect 210 may include a communication bus or a switch fabric. Bus 212 may include a path that permits communication among components of security device 104.

In some implementations, functionalities of some components of security device 104 may be incorporated into other components of security device 104. For example, part of processor 202 may be included in line interface 206 and/or 208, so that line interfaces 206/208 may perform operations that are associated with forwarding packets.

Figure 3:
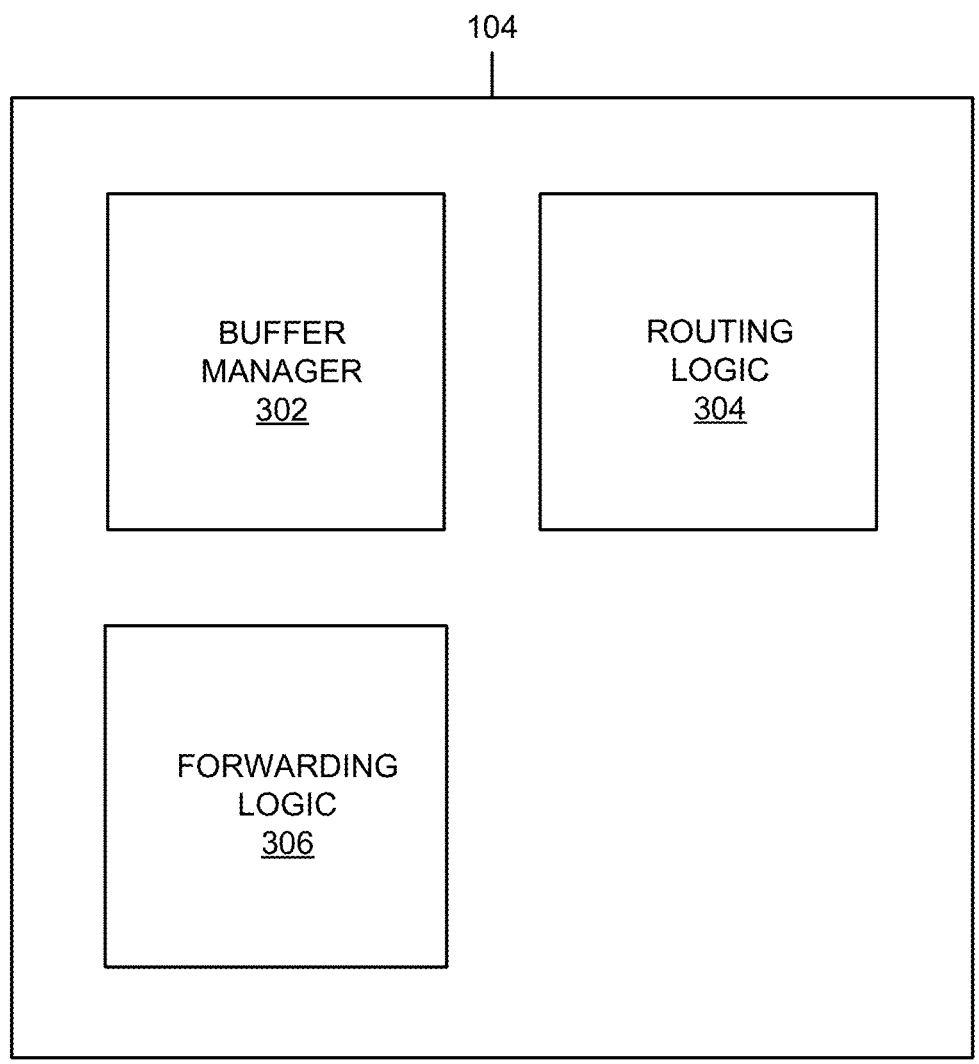
FIG. 3 is a functional block diagram of the exemplary security device of FIG. 1.

FIG. 3 is a functional block diagram of security device 104. As shown, security device 104 may include a buffer manager 302, routing logic 304, and forwarding logic 306. Depending on implementation, security device 104 may include fewer, additional, or different components than those illustrated in FIG. 3.

Buffer manager 302 may provide a buffer for queuing incoming packets and information about the packets. If packets arrive simultaneously, one or more of the packets may await in the buffer until higher priority packets are processed and/or transmitted. Routing logic 304 may include hardware and/or software for communicating with other routers to gather and store routing information in a routing information base (RIB). Forwarding logic 306 may include hardware and/or software for directing a packet to a proper output port on line interface 208 based on the routing information.

Figure 4A:
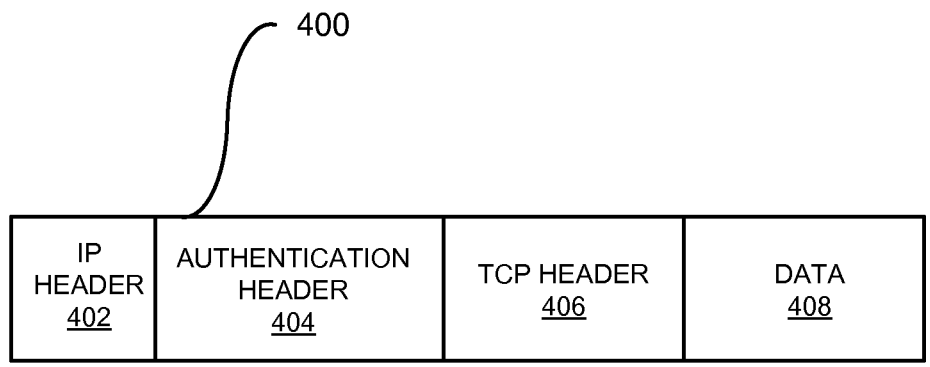
FIGS. 4A and 4B show block diagrams of packets in a buffer manager of FIG. 3.

FIG. 4A is a block diagram of a packet 400 that may be buffered by buffer manager 302 under Internet Protocol version 4 (IPv4). As illustrated, packet 400 may include an IP header 402, an authentication header (AH) 404, a Transmission Control Protocol (TCP) header 406, and data field 408. IP header 402 may include information related to IP (e.g., the version of the IP, the length of the IP header, etc.), a quality-of-service that the packet may require, the length of the packet, an identification tag, etc. AH 404 may include information for checking data integrity of packet 400, performing data authentication, and providing a mechanism against replays. TCP header 406 may indicate the TCP communication protocol for packet 400. Data field 408 may include a payload.

Figure 4B:
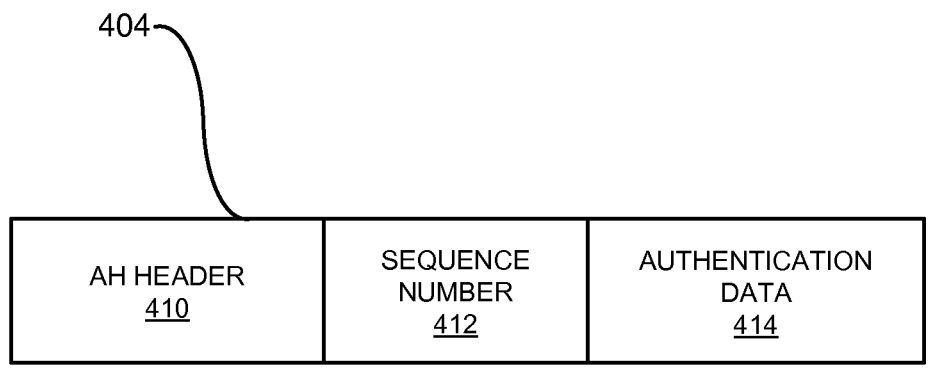

FIG. 4B is a block diagram of AH 404. As shown, AH 404 may include AH header 410, an IPSec sequence number field 412, and authentication data field 414. AH header 410 may include one or more fields for information related to AH 404 (e.g., such as the payload length of AH 404, a type of payload that follows AH header 410, a security parameter index for identifying the security association (SA) for the packet, etc.). IPSec sequence number field 412 may include a 32-bit field that holds an IPSec sequence number. A sequence of packets in a communication session may carry monotonically increasing IPSec sequence numbers that may be used to perform anti-replay checks. A packet sender may transmit a value in IPSec sequence number field 412, regardless of whether the packet receiver uses the IPSec sequence number. Authentication data 414 may include an Integrity Check Value (ICV) for packet 400. As the term implies, ICV may be used to check the integrity of packet 400.

In some implementations, the structure of packet 400 may be different from that illustrated in FIGS. 4A and 4B. For example, if packet 400 is being transported under Internet Protocol version 6 (Ipv6), packet 400 may carry additional or different fields. In yet another example, packet 400 may include Encapsulating Security Payload (ESP) header in place of AH 404. ESP header may carry similar pieces of information as AH 404. For example, both AH 404 and an ESP header may include one or more fields for an IPSec sequence number (e.g., IPSec sequence number field 412).

Figure 5:
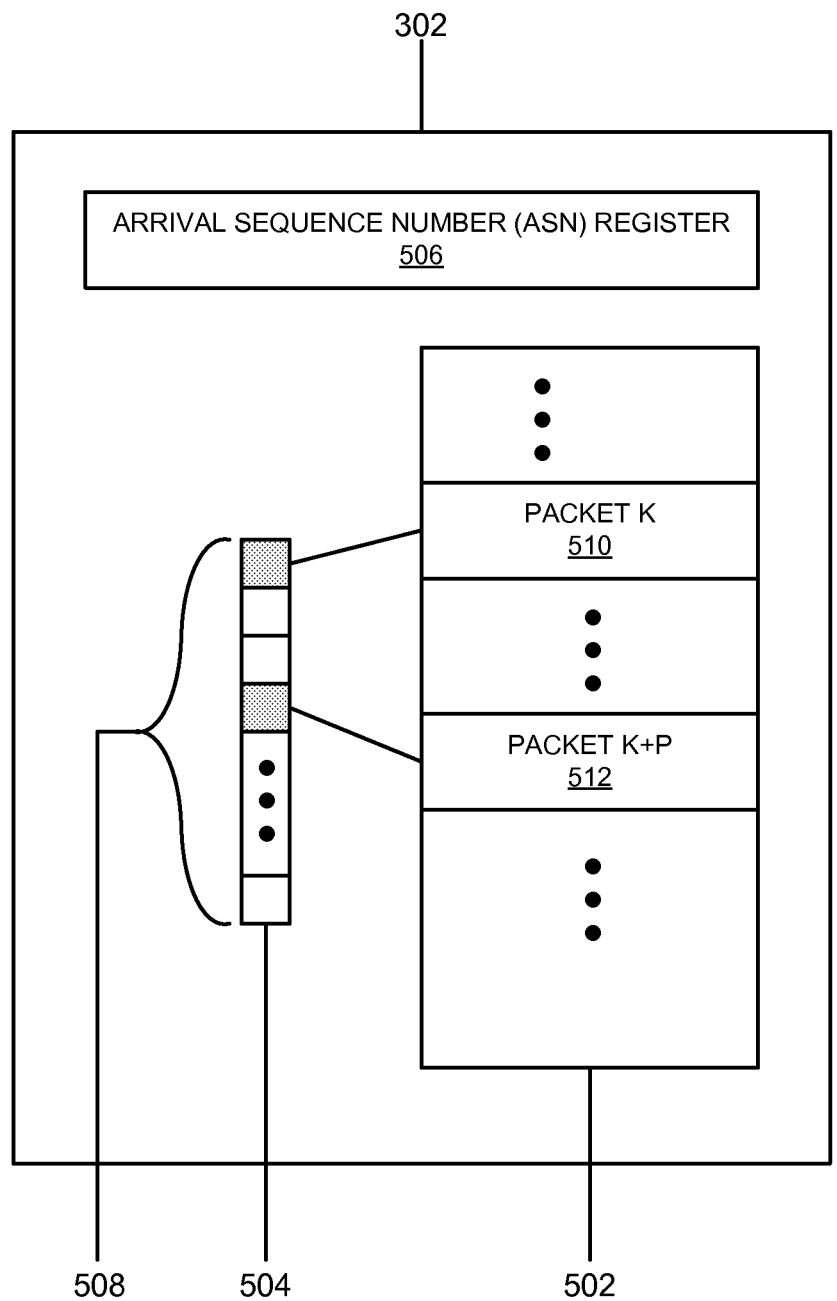
FIG. 5 is a block diagram of a buffer manager of FIG. 3 and processor of FIG. 2.

FIG. 5 shows a block diagram of buffer manager 302. As illustrated, buffer manager 302 may include packet buffer 502, an IPSec anti-replay check window 504, and an arrival sequence number register 506. Packet buffer 502 may include a queue for packets and information that is related to the packets (e.g., an ASN). In FIG. 5, packet buffer 502 may include packet K 510 . . . , and packet K+P 512, where K . . . , and K+P represent IPSec sequence numbers in AH 404 of the packets in packet buffer 502. Packets that arrive through line interfaces 206/208 may be processed (e.g., stripped of different types of headers), may receive ASNs, may be placed in packet buffer 502, and may be removed from packet buffer 502 after further processing.

IPSec anti-replay check window 504 may include a bitmap 508 of information related to some of the packets in packet buffer 502. When a packet arrives at security device 104, an IPSec sequence number of the packet may be extracted from its header. Further, the IPSec sequence number of the packet may be used to locate a corresponding bit in bitmap 508 and to set the bit to a value (e.g., "1"). If a second packet arrives at security device 104, bitmap 508 may be consulted in order to determine if the IPSec sequence number of the second packet has been detected at security device 104, depending on the value of the bit. If the IPSec sequence number has been detected or seen previously, the second packet may be considered a replay packet and dropped.

ASN register 506 may include hardware and/or software for storing an ASN that is associated with a packet. ASN register 506 may store the latest ASN of the packets whose IPSec sequence numbers are within IPSec anti-replay check window 504. For example, in one implementation, if there are two packets whose IPSec sequence numbers are within IPSec anti-replay check window 504, and if the ASN of the two packets are FPGA sequence numbers 3 and 5, respectively, ASN register 506 may contain the FPGA sequence number of 5. In another example, in a different implementation, if the ASN of the two packets are arrival times 23:34:15.123 and 23:34:15.125, ASN register 506 may contain the arrival time of 23:34:14.125.

Figure 6:
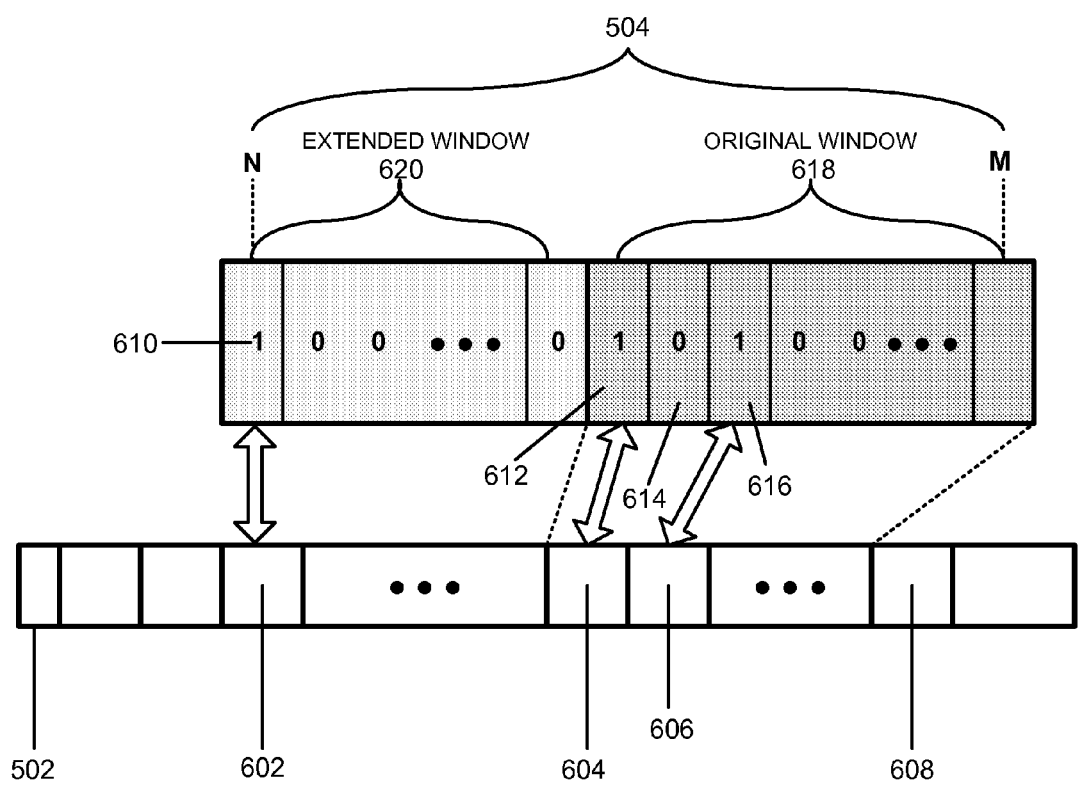
FIG. 6 shows an anti-replay check window of FIG. 5 and packets in the packet buffer of FIG. 5.

FIG. 6 shows IPSec anti-replay check window 504 and packet buffer 502. As shown, IPSec anti-replay check window 504 may cover range [N, M]. Packet buffer 502 may buffer packets 602-608. In FIG. 6, the IPSec sequence number of packets 602-606 may correspond to bits 610, 612, and 616, respectively, and no packet may have an IPSec sequence number that corresponds to bit 614. Among packets 602-608 in packet buffer 502, the IPSec sequence number of packet 608 may be outside of range [N, M].

In IPSec anti-replay check window 504, a bit value of "1" may indicate that a packet whose IPSec sequence number corresponds to the bit is detected along with the IPSec sequence number. For example, in FIG. 6, bits 610, 612, and 616 may have the value of "1," and may indicate that packets 602, 604, and 606 and their IPSec sequence numbers are detected. If a new packet arrives at security device 104, IPSec anti-replay check window 504 may be consulted to determine if the IPSec sequence number of the new packet has been detected previously at security device 104. If examining the bit which corresponds to the IPSec sequence number of the new packet indicates that the IPSec sequence number has been detected previously at security device 104, the new packet may be considered a replay packet and dropped.

In FIG. 6, the range of IPSec anti-replay check window 504 may change if a packet whose IPSec sequence number is greater than the highest number in the range of IPSec anti-replay check window 504 is checked for anti-replay. In such instances, IPSec anti-replay check window 504 may advance to a new range that spans the same number of bits. For example, in FIG. 6, the range for IPSec anti-replay check window 504 at a given instant may be [N, M]. If packet 608 is checked for anti-replay and IPSec sequence number for packet 608 is M+1, the new range for IPSec anti-replay check window 504 may become [N+1, M+1]. If, during the anti-replay check, the IPSec sequence number of a packet is found to be less than the lowest number in the range of IPSec anti-replay check window 504, and/or if the IPSec sequence number of the packet has already been detected according to the bitmap 508, the packet may be considered a potential replay packet. The packet may be dropped (e.g., removed from packet buffer 502) to protect the system against replay attacks.

As further shown in FIG. 6, IPSec anti-replay check window 504 may include original window 618 and extended window 620. The length of original window 618 may depend partly on known standards for IPSec, as described by many publications, such as Request for Comments (RFC) 4302. RFC 4302 specifies the length of original window 618 to be either 32-bits or 64-bits long. Extended window 620 may allow multiple processors in security device 102 to perform anti-replay checks on incoming packets in the same order that a single processor system may perform the anti-replay checks. Extended window 620 may not be noticeable from outside. If the multiprocessor system as viewed as a black box during its operation, an external observer may only be aware of the original window.

The length of extended window 620 may depend on performance of IPSec anti-replay check window 504, and the performance may be measured by the number of packets that are dropped when no replay packets are received. For example, suppose that the length of extended window 620 is 128-bits and IPSec anti-replay check window 504 can advance through 100,000 packets in a second, while dropping 3 packets even though there are no replay packets over the time period. The error rate may be determined as $3/100,000 = 3 \times 10^{-5}$. If increasing the size of extended window 620 to 256-bits lowers the error rate to, for example, $2 \times 10^{-5}$, extended window 620 may be set to 256-bits, assuming other operational parameters related to IPSec anti-replay check window 504 are not negatively affected (e.g., packet processing speed is not reduced).

EXEMPLARY PROCESSES FOR PERFORMING HEURISTIC IPSEC ANTI-REPLAY CHECKS

Figure 7A:
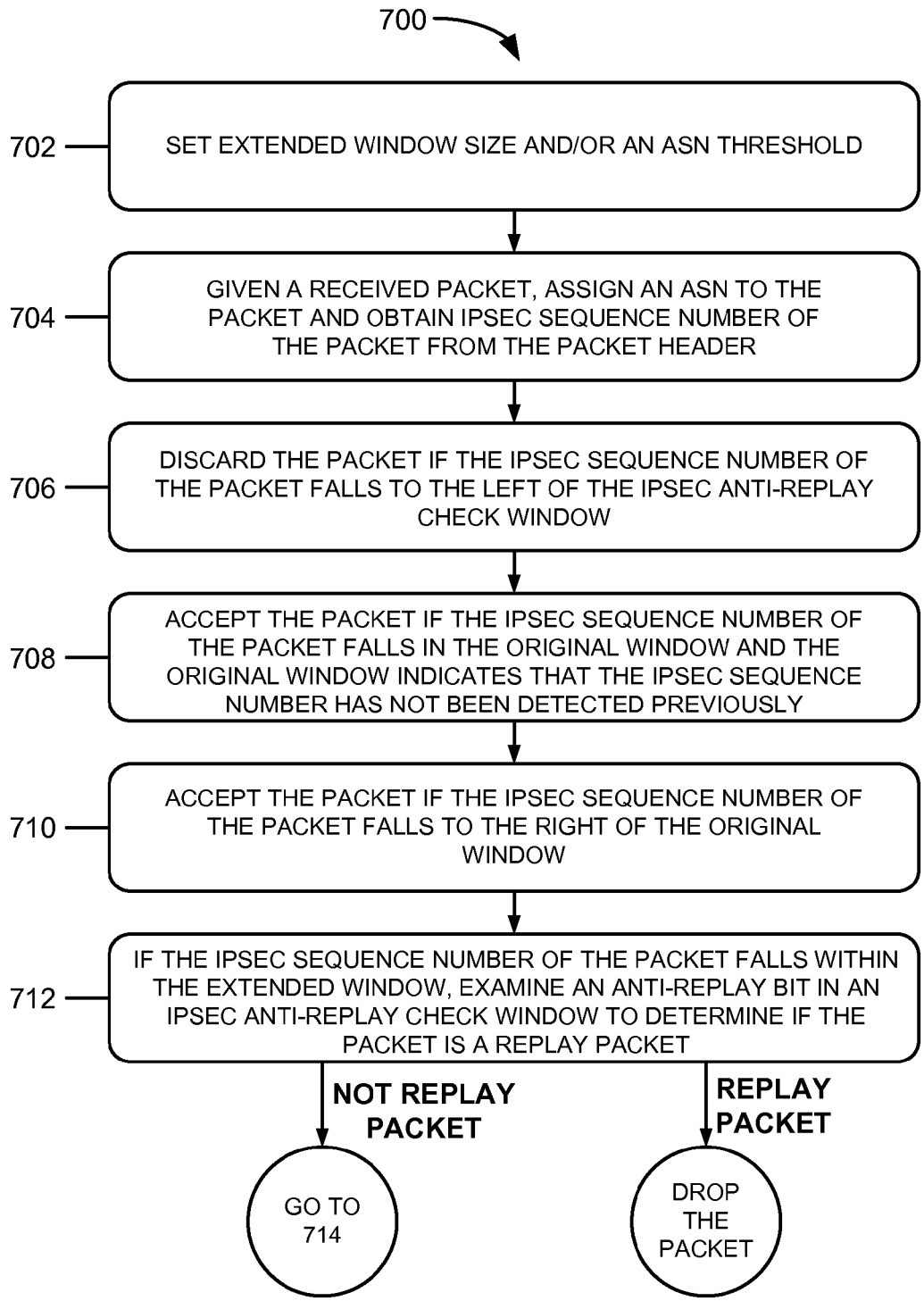
FIGS. 7A and 7B show an exemplary process for performing heuristic anti-replay checks.
Figure 7B:
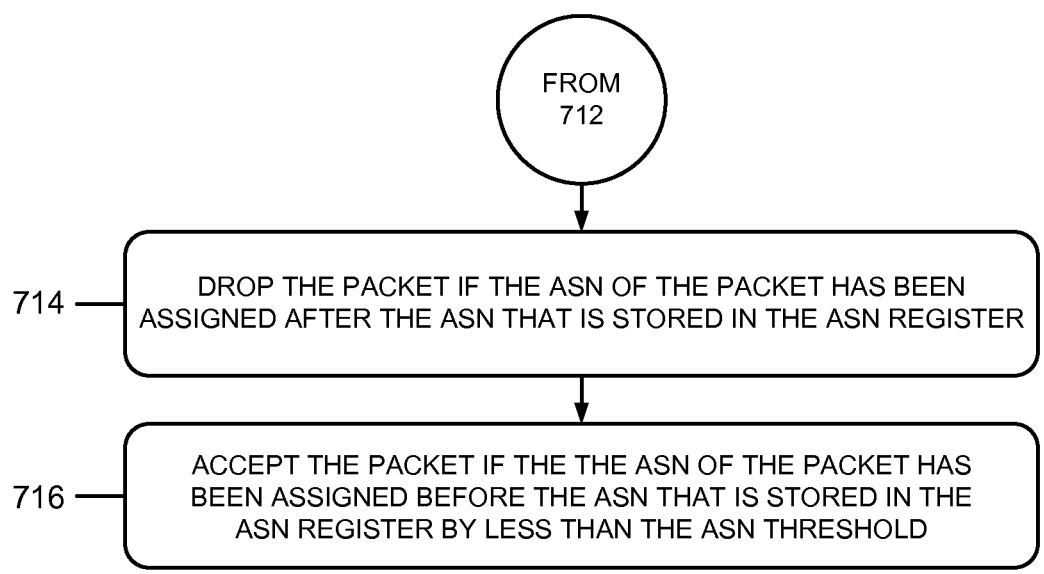

The above paragraphs describe system elements that are related to devices and/or components for performing heuristic IPSec anti-replay checks. FIGS. 7A and 7B depict an exemplary process 700 that is capable of being performed by one or more of these devices and/or components.

Generally, process 700 may involve the use of extended window 620 and ASN register 506. In symmetric multiprocessor (SMP) environments, without the use of extended window 620 and ASN register 506, packets that are checked for anti-replays may be dropped even though the packets are not replay packets.

To explain, consider two packets with IPSec sequence numbers 100 and 165. The packets are sent from security device 102 and arrive in order at a single processor environment with an IPSec anti-replay check window whose range is [100, 163].

In the single processor environment, the packets may be checked for anti-replay in the order that they arrive. Therefore, packet 100 may be checked for anti-replay and accepted before packet 165 is checked for anti-replay.

In a SMP environment, packets 100 and 165 may be checked for anti-replay by different processors. Furthermore, the processor in charge of packet 165 may finish performing an anti-replay check on packet 165 before another processor finishes an anti-replay check on packet 100. In such an instance, the processing of packet 165 may advance the IPSec anti-replay check window to a new range [102, 165]. The processor in charge of packet 100 may detect that packet 100 is not in the new range, so cannot decide if the packet is a replay packet or not. Consequently, packet 100 may be dropped.

In order to avoid dropping packets unnecessarily during anti-replay checks, process 700 may employ extended window 620 and ASN register 506. With extended window 620, even if a processor finishes an anti-replay check on packet 165 and advances IPSec anti-replay check window 504 from range [100, 163] to new range [102, 165], packet 100 may still fall within extended window 620. If the packet does fall within extended window 620, packet 100's ASN may be checked to determine if packet 100 has arrived at security device 104 before packet 165. If packet 100 has arrived before packet 165, packet 100 may be accepted. This would make the SMP system behavior as same as that for a single-processor system.

In some SMP environments, without the use of extended window 620 and/or ASN register 506, all packets that originate from a single SA entity may be directed to a single processor. Such systems may avoid the situation in which non-replay packets are dropped due to advancing IPSec anti-replay check window 504. However, should the majority of received packets be sent from a single SA entity, the systems may be forced to drop packets that the single processor cannot process, even if other processors are idle. In contrast, by using extended window 620 and ASN register 506, process 700 may avoid overloading a single processor. As shown, process 700 may begin at block 702, where the size of extended window 620 (FIG. 6) and the value of an ASN threshold are set. In one implementation, the size of the window and the ASN threshold may be set by a system administrator or through a set of instructions (e.g., a program or a script, etc.). The ASN threshold may approximately correlate with the maximum duration of time that a packet with an ASN can be delayed from being checked for anti-replay, and therefore, may reflect the size of extended window 620. If the ASN threshold is 256, the extended window size may be set to 256. The threshold may be dynamically determined based on a heuristic. The system may adjust the size if too many packets are being dropped with the current threshold.

At block 704, given a received packet, an ASN may be assigned to the packet and an IPSec sequence number of the packet may be obtained from the packet header. The ASN may be assigned in different ways. For example, if the ASN is a FPGA sequence number, the ASN may be assigned by obtaining a number from a counter that is incremented each time a packet arrives at security device 104 and by associating the number with the packet. In another example, if the ASN is a time stamp, the ASN may be assigned by obtaining a time stamp from security device 104 and by associating the time stamp with the packet.

If the IPSec sequence number of the packet falls to the left of IPSec anti-replay check window 504, the packet may be discarded (block 706). To determine whether the IPSec sequence number falls to the left of IPSec anti-replay check window 504, the lowest number in the range of the IPSec anti-replay check window 504 may be compared to the IPSec sequence number of the packet. For example, in FIG. 6, if the IPSec sequence number of a packet is less than N, the IPSec sequence number of the packet may be deemed to have fallen to the left of IPSec anti-replay check window 504.

If the IPSec sequence number of the packet falls in original window 618 and the original window indicates that the IPSec sequence number of the packet has not been detected previously, the packet may be accepted (block 708). In determining whether IPSec sequence number of the packet falls in original window 618, the sequence number of the packet may be compared to the lowest and the highest numbers in the range of original window 618.

If the packet is accepted and the ASN of the packet indicates that the ASN of the packet has been assigned after the ASN in ASN register 506, ASN register 506 may be updated by storing the ASN of the packet in ASN register 506. For example, if the ASN is a FPGA sequence number and if the FPGA sequence number of the packet is greater than the FPGA sequence number that is stored in ASN register 506, the FPGA sequence number of the packet may be stored in ASN register 506. In another example, if the ASN of the packet is a time stamp, the time stamp of the packet may be compared to the time stamp stored in ASN register 506. If the time stamp of the packet is later than the time stamp stored in ASN register 506, the time stamp of the packet may be stored in ASN register 506.

If the IPSec sequence number of the packet falls to the right of original window 618, the packet may be accepted (block 710). If the packet is accepted and the ASN of the packet indicates that the ASN of the packet has been assigned after the ASN in ASN register 506, ASN register 506 may be updated by storing the ASN of the packet in ASN register 506. In determining whether IPSec sequence number of the packet falls to the right of original window 618, the sequence number of the packet may be compared to the highest number in the range of IPSec anti-replay check window 504. ASN register 506 may be updated in a manner similar to ASN register 506 at block 708.

At block 712, if the IPSec sequence number of the packet falls within extended window 620, the corresponding bit in the extended window 620 may be examined to determine if the packet is a replay packet.

If the bit in IPSec anti-replay check window 504 is set to a value ("1") that indicates that the IPSec sequence number of the packet has been detected previously, the packet may be identified as a replay packet. Consequently, the packet may be dropped. If the packet is not a replay packet, process 700 may proceed to block 714.

At block 714, the packet may be dropped if the ASN of the packet has been assigned after the ASN that is stored in ASN register 506. The packet may be dropped irrespective of whether the packet is a replay packet or not, in order to imitate a single processor system with original window 618. If the ASN is a FPGA sequence number, the ASN of the packet may have been assigned after the ASN that is stored in ASN register 506 if the FPGA sequence number of the packet is greater than the FPGA sequence number stored in ASN register 506. If the ASN is a time stamp, the ASN of the packet may have been assigned after the ASN that stored in ASN register 506 if the time stamp of the packet is later than the time stamp that is stored in ASN register 506. If the packet is not dropped, process 700 may proceed to block 716.

At block 716, if the ASN of the packet has been assigned before the ASN that is stored in ASN register 506 by less than the ASN threshold, the packet may be accepted. Stated in another way, the packet may be accepted if the following condition is satisfied:

$$\text{delay(ASN no. in ASN register, ASN no. of the packet)} < \text{ASN threshold} \qquad (1),$$

where delay(a, b) measures the difference between the ASN of the packet and the ASN that is stored in ASN register 506. Satisfying condition (1) may indicate that a delay before the packet is checked for anti-replay attacks is less than an acceptable level, and therefore, the packet may not be dropped.

In process 700, the ASN threshold may be determined based on heuristics. For example, the ASN threshold may be chosen, depending on the performance of IPSec anti-replay check window 504. More specifically, for example, if ASN is FPGA sequence number, the ASN threshold may be initially set to 64. If temporarily changing the ASN threshold to 128 improves the performance of IPSec anti-replay check window 504, the ASN threshold may be set to 128.

EXAMPLE

The following example illustrates the process for performing heuristic IPSec anti-replay checks in accordance with implementations described above with reference to FIGS. 1-6. The example illustrates how the heuristic IPSec anti-replay check may avoid dropping packets unnecessarily. The example is also consistent with the exemplary process described above with reference to FIGS. 7A and 7B.

Figure 8A:
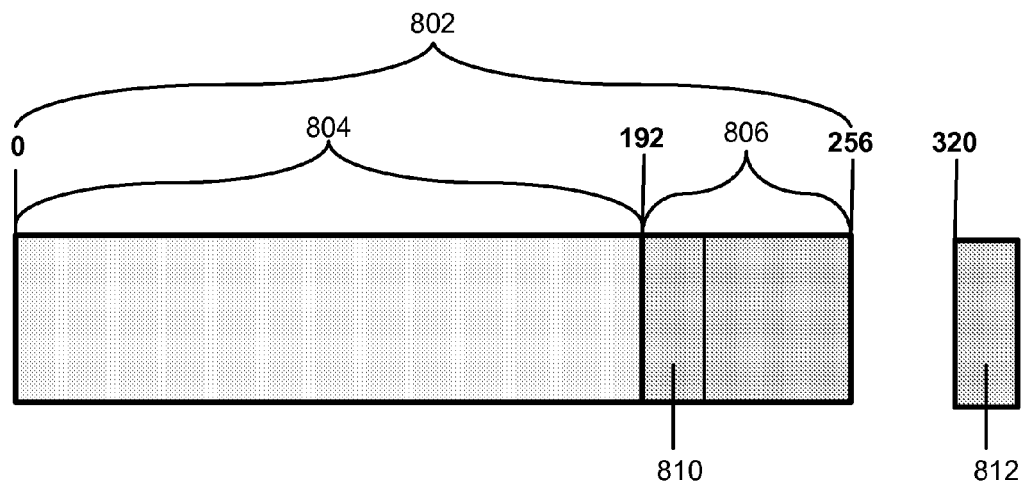
FIGS. 8A and 8B illustrate Internet Protocol Security (IPSec) anti-replay check windows.

In the example, as illustrated in FIG. 8A, assume that, in security device 104, IPSec anti-replay check window 802 includes extended window 804 of length 192 and original window 806 of length 64. In addition, assume that a packet 810, which has an IPSec sequence number of 192, arrives at security device 104 before packet 812, which has an IPSec sequence number of 320. Further, assume that security device 104 includes processor A and processor B. Also, assume that security device 104, which has an ASN threshold of 64, assigns FPGA sequence numbers 3 and 4 to packets 810 and 812, respectively.

Figure 8B:
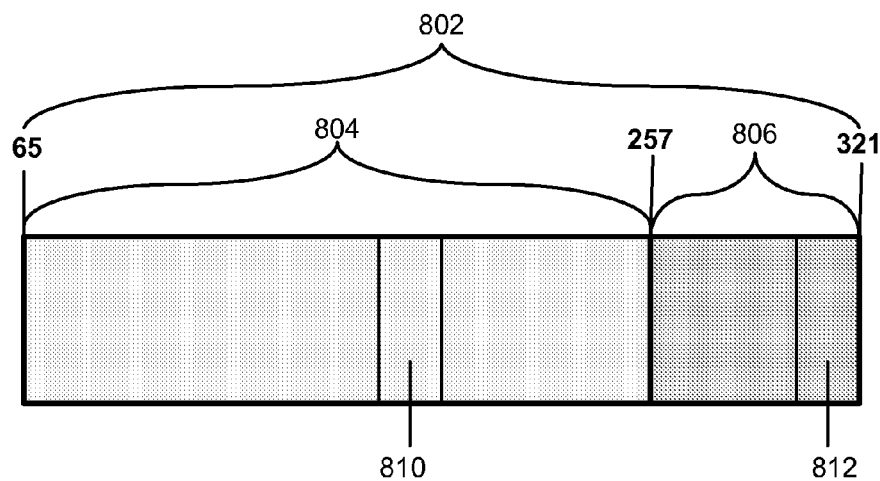

Upon the arrival of packet 810, processor A begins an anti-replay check on packet 810. When packet 812 arrives, processor B begins an anti-replay check on packet 812. Because processor A is occupied with other packets, processor B finishes the anti-replay check on packet 812 before processor A finishes the anti-replay check on packet 810. Processor B advances IPSec anti-replay check window 802 from range [0, 255] to [65, 320]. FIG. 8B shows IPSec anti-replay check window 802 after IPSec anti-replay check window 802 has advanced. The FPGA sequence number of packet 812 is stored in ASN register 506.

When processor A finishes the anti-replay check on packet 810, processor A discovers that IPSec anti-replay check window 802 no longer includes an anti-replay bit for packet 810 in original window 806. Processor A checks if an anti-replay bit for packet 810 is included in extended window 804, and finds the anti-replay bit within extended window 804. Processor A compares the FPGA sequence number of packet 810 against the FPGA sequence number that is stored in ASN register 506. Upon determining that packet 810's FPGA sequence number of 3 is smaller than the FPGA sequence number of 4 by less than the ASN threshold, processor A accepts packet 810.

In the example, anti-replay checks similar to the one described above are performed for arriving packets for various values of the ASN threshold (e.g., 16, 32, 64, 80, etc.). Upon measuring performance of anti-replay checks in security device 104 for different values of the ASN threshold, it is determined that the ASN threshold of 64 allows security device 104 to perform anti-replay checks most optimally. The ANS threshold is set to the value of 64.

CONCLUSION

The foregoing description of implementations provides illustration, but is not intended to be exhaustive or to limit the implementations to the precise form disclosed. Modifications and variations are possible in light of the above teachings or may be acquired from practice of the teachings. For example, while devices and components have been described with respect to packets, the principles and the concepts may apply to other types of communication data, such as Asynchronous Transfer Mode (ATM) cells.

In another example, while series of blocks have been described with regard to processes illustrated in FIGS. 7A and 7B, the order of the blocks may be modified in other implementations. More specifically, block 702 may be performed after block 704, 706, 708, or 710. In addition, non-dependent blocks may represent acts that can be performed in parallel to other blocks, such as blocks 702 and 704.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, by a network device, a plurality of packets,
      each of the plurality of packets including an anti-replay sequence number;
   determining, by the network device, that the anti-replay sequence number of a particular packet, of the plurality of packets, exceeds an upper limit of a predetermined range of anti-replay sequence numbers;
   shifting, by the network device, the predetermined range of anti-replay sequence numbers by an amount that is based on the anti-replay sequence number of the particular packet,
      a highest number of the predetermined range of anti-replay sequence numbers being equal to the anti-replay sequence number of the particular packet;
   determining, by the network device and when another anti-replay sequence number of another packet, of the plurality of packets, falls below the shifted predetermined range of anti-replay sequence numbers, whether the anti-replay number of the other packet falls within an extended range of anti-replay sequence numbers,
      the extended range of anti-replay sequence numbers comprising an upper limit that is defined by a lower limit of the shifted predetermined range of anti-replay sequence numbers;
   determining, by the network device and when the anti-replay sequence number of the other packet falls within the extended range, whether the other packet arrived at the network device before the particular packet by less than a threshold amount of time,
      the threshold amount of time being based on a maximum delay associated with processing the plurality of packets; and selectively:
  retaining the other packet when the other packet arrived at the network device before the particular packet by less than the threshold amount of time; or
  dropping the other packet when the other packet did not arrive at the network device before the particular packet by less than the threshold amount of time.

2. The method of claim 1,
where the network device comprises multiple processors,
where a first processor of the multiple processors determines that the anti-replay sequence number of the particular packet exceeds the upper limit of the predetermined range, and
where a second processor of the multiple processors determines that the anti-replay sequence number of the other packet falls within the extended range of anti-replay sequence numbers to imitate an anti-replay check method of a single processor system.

3. The method of claim 1, further comprising:
selecting a value for the threshold amount of time based on heuristics associated with the predetermined range of anti-replay sequence numbers.

4. The method of claim 1, further comprising:
assigning an arrival sequence number to each of the plurality of packets.

5. The method of claim 4, where determining whether the other packet has arrived before the particular packet by less than the threshold amount of time includes:
determining whether the arrival sequence number of the other packet is lower than the arrival sequence number of the particular packet by less than the threshold amount of time.

6. The method of claim 1, where determining whether the other packet has arrived before the particular packet by less than the threshold amount of time includes:
comparing a time stamp of the other packet to a time stamp of the particular packet.

7. The method of claim 1, further comprising:
dropping the other packet when the anti-replay sequence number of the other packet is less than a lower limit of the extended range of anti-replay sequence numbers.

8. The method of claim 1, further comprising:
retaining the other packet when the anti-replay sequence number of the other packet exceeds the upper limit of the shifted predetermined range of anti-replay sequence numbers.

9. The method of claim 8, further comprising:
shifting the shifted predetermined range of anti-replay sequence numbers to cause a shifted upper limit of the shifted predetermined range of anti-replay sequence numbers to comprise the anti-replay sequence number of the other packet when the anti-replay sequence number of the other packet is greater than the highest number of the shifted predetermined range of anti-replay sequence numbers.

10. The method of claim 1, further comprising:
accepting the other packet when the anti-replay sequence number is within the shifted predetermined range of anti-replay sequence numbers and when the shifted predetermined range of anti-replay sequence numbers does not indicate that any of the plurality packets comprising the anti-replay sequence number has already been received by the network device.

11. The method of claim 1, further comprising:
storing a largest arrival anti-replay sequence number of the plurality of packets in an arrival sequence number register.

12. A device comprising:
a memory device to store information defining an original window and an extended window,
the original window being defined by a first range of anti-replay numbers,
the extended window being defined by a second range of anti-replay numbers that is contiguous with the first range of anti-replay numbers of the original window, and
an upper limit of the extended window corresponding to a lower limit of the original window;
one or more processors to:
determine whether a first anti-replay number exceeds an upper limit of the first range of anti-replay numbers;
shift the first range of anti-replay numbers by an amount that is based on the first anti-replay number,
a highest number of the first range of anti-replay numbers being equal to the first anti-replay number;
receive a packet including an that includes a second anti-replay number;
determine whether the second anti-replay number of the packet falls within the second range of anti-replay numbers;
determine, when the second anti-replay number of the packet falls within the second range of anti-replay numbers, whether the packet arrived before another packet by less than a threshold amount of time corresponding to a maximum amount of delay for processing the packet;
accept the packet when the packet arrived before the other packet by less than the threshold amount of time; and
drop the packet when the packet did not arrive before the other packet by less than the threshold amount of time.

13. The device of claim 12, where the one or more processors are further to:
imitate a single processor device, that includes the original window, by using the original window and the extended window.

14. The device of claim 12, where the first range of anti-replay numbers and the second range of anti-replay numbers include consecutive anti-replay numbers.

15. The device of claim 14, where the one or more processors are further to:
change a range of the original window after determining that an anti-replay number of the other packet is greater than any of the consecutive anti-replay numbers in the first range of the anti-replay numbers.

16. The device of claim 12, where the one or more processors are further to:
assign arrival numbers to packets in an order that the packets are received by the device,
the packets including the packet and the other packet.

17. The device of claim 16, where an arrival number, of the arrival numbers, assigned to the packet includes a time at which the packet is received by the device.

18. The device of claim 12, further comprising:
a register for storing a highest arrival number of accepted packets including anti-replay numbers within the first range of anti-replay numbers.

19. The device of claim 12, where the one or more processors are further to:
select a value for the threshold based on heuristics associated with the original window.

20. The device of claim 12, where the anti-replay number is less than a smallest anti-replay number within the second range of anti-replay numbers when the packet is dropped.

21. A system comprising:
a device to:
store an anti-replay check window that is defined by an upper limit, of a first range of sequence numbers that define an original window, and a lower limit, of a second range of sequence numbers that define an extended window,
the lower limit of the first range of sequence numbers comprising the upper limit of the second range of sequence numbers;
determine that a first sequence number associated with a first packet exceeds an upper limit of a first range of sequence numbers;
shift the first range of sequence numbers by an amount that is based on the first sequence number of the first packet,
a highest number of the first range of sequence numbers being equal to the first sequence number of the first packet,
receive a second packet;
determine whether a second sequence number associated with the second packet falls within a second range of sequence numbers,
the second range of sequence numbers comprising an upper limit that is defined by a lower limit of the shifted first range of sequence numbers;
determine, when the second sequence number falls within the second range of sequence numbers, whether the second packet arrived before another the first packet by less than a threshold amount of time,
the threshold amount of time being based on a maximum delay associated with processing packets; and
selectively:
retain the second packet when the second packet arrived before the other first packet by less than the threshold amount of time; or
drop the second packet when the second packet did not arrive before the other first packet by less than the threshold amount of time.

22. The method of claim 1, where the predetermined range of anti-replay sequence numbers defines a window comprising a length of 32 bits or a length of 64 bits.

* * * * *